United States Patent
Rademacher (10) Patent No.: US 8,752,763 B2
(45) Date of Patent: Jun. 17, 2014

(54) APPARATUS AND METHOD FOR IDENTIFICATION AND/OR MARKING OF OBJECTS BY MEANS OF RFID

(75) Inventor: Horst Rademacher, Ostercappeln (DE)

(73) Assignee: Felix Schoeller Supply Chain Technologies GmbH & Co. KG, Osnabruck (DE)

( * ) Notice: Subject to any disclaimer, the term of this patent is extended or adjusted under 35 U.S.C. 154(b) by 145 days.

(21) Appl. No.: 13/132,511

(22) PCT Filed: Dec. 3, 2009

(86) PCT No.: PCT/EP2009/066347
§ 371 (c)(1),
(2), (4) Date: Jun. 29, 2011

(87) PCT Pub. No.: WO2010/063799
PCT Pub. Date: Jun. 10, 2010

(65) Prior Publication Data
US 2011/0248084 A1    Oct. 13, 2011

(30) Foreign Application Priority Data
Dec. 3, 2008 (DE) .................. 10 2008 060 145

(51) Int. Cl.
*G06F 17/00*    (2006.01)
*G06K 7/00*     (2006.01)
*G06K 7/08*     (2006.01)

(52) U.S. Cl.
USPC ........... 235/440; 235/375; 235/435; 235/451; 340/10.1

(58) Field of Classification Search
USPC ........ 235/451, 375, 435, 440; 340/10.1–10.6, 340/572.1–572.7; 343/880–883
See application file for complete search history.

(56) References Cited

U.S. PATENT DOCUMENTS

| | | | |
|---|---|---|---|
| 6,940,392 B2 * | 9/2005 | Chan et al. | 340/10.4 |
| 7,036,734 B2 * | 5/2006 | Baker | 235/451 |
| 7,999,676 B2 * | 8/2011 | Cheung et al. | 340/572.1 |
| 2004/0004577 A1 * | 1/2004 | Forster | 343/866 |
| 2004/0070503 A1 | 4/2004 | Monahan | |
| 2005/0043854 A1 | 2/2005 | Dunlap | |

(Continued)

FOREIGN PATENT DOCUMENTS
WO    2008013846 A2    1/2008

OTHER PUBLICATIONS
International Search Report for PCT/EP2009/066347, dated Mar. 17, 2010.

*Primary Examiner* — Michael G Lee
*Assistant Examiner* — Laura Gudorf
(74) *Attorney, Agent, or Firm* — Honigman Miller Schwartz and Cohn LLP (57) ABSTRACT

The invention relates to an apparatus for identification and/or marking of objects (6) by means of RFID having a read or write/read unit (1) for wire-free reading from and/or writing to a memory unit (8a) of an RFID transponder (8) which is connected to the object (6) to be identified and/or to be marked, wherein the read or write/read unit (1) has a transmitting/receiving module (3), which has at least one antenna (4, 41, 42, 43, 44, 45). According to the invention, the apparatus is characterized in that the at least one antenna (4, 41, 42, 43, 44, 45) is arranged such that it can move. The invention also relates to a method for identification and/or marking of an object (6) by means of RFID.

20 Claims, 10 Drawing Sheets (56) References Cited

U.S. PATENT DOCUMENTS

2007/0234643 A1* 10/2007 Siegal et al. .................... 49/360
2008/0024306 A1 1/2008 Bomber et al.
2008/0117055 A1* 5/2008 Blake et al. ................ 340/572.7
2009/0021375 A1* 1/2009 Stagg ......................... 340/572.1

* cited by examiner

APPARATUS AND METHOD FOR IDENTIFICATION AND/OR MARKING OF OBJECTS BY MEANS OF RFID

This application is the U.S. National phase of PCT Application Serial No. PCT/EP2009/066347, filed Dec. 3, 2009, which claims the priority of German Application Serial No. 10 2008 060 145.4, filed Dec. 3, 2008, both of which documents are incorporated herein by reference in their entirety.

The invention relates to an apparatus for identification and/or marking of objects by means of RFID with a read or write/read unit for wireless reading from and/or writing to a memory unit of an RFID transponder connected to the object to be identified and/or marked, the at least one read or write/read unit comprising a transmitting/receiving module having at least one antenna. Furthermore, the invention relates to a method for identification and/or marking of an object by means of RFID.

RFID methods (radio frequency identification) have been known for years from the prior art. These are methods for the automatic identification of object or beings, in which a reading device sets up a wireless connection via an electromagnetic high frequency field with a small range to the RFID transponder connected to the object to be identified, the energy of the high frequency field in the RFID transponder being used to read a chip contained in the transponder, which leads to a field weakening. The RFID transponder then reflects the irradiated high frequency field, the information read from the memory of the RFID transponder and identifying the object being modulated onto the reflected signal. The modulated signal is then detected by the read device by its transmitting/receiving module and processed, for example passed to an EDP device, whereby the identification process is completed.

RFID methods are used in the production industry and commercially in many ways. The apparatuses used here, apart from identifying objects, partly also allow them to be marked, i.e. writing to the memory contained in the RFID transponder in order, for example, to store properties changed during the course of a production process, such as for example the weight, of the object provided with the RFID transponder, in the latter.

In the paper industry the object exists that tubes wound with a paper web and provided with an RFID transponder have to be identified by means of RFID and also have to be marked again at various points during production and delivery, the marking requiring the rewriting of the memory. It proves to be a problem here that the marking of the RFID transponder incorporated into the tube requires considerably more energy than simply reading. Since for cost reasons, passive RFID transponders, which have no energy source of their own, are regularly used, the energy provided by the high frequency field at the site of the RFID transponder is often insufficient because of the strong damping of the paper wound onto the tube to ensure a reliable marking process.

In a solution known in practice, a total of three antennas of the transmitting/receiving module of a write/read unit are mounted on a portal-like framework, one respective antenna being mounted on the two vertical supports and being oriented in the direction of the passage defined by the framework, while a further antenna is oriented downwardly from an upper horizontal framework portion in the direction of the passage. With this antenna configuration, in which the paper rolls transported through the framework either in the upright state or lying transverse to the transporting direction are always oriented with one of their end faces toward one of the antennas, identification processes, i.e. the pure reading from the memory of the RFID transponder for the purpose of identification of the paper roll provided with the RFID transponder, can be carried out with adequate operating reliability. Because of the damping by the wound-on paper web, the marking processes can, however, only be carried out with a low degree of reliability, so that it is often necessary to stop the transportation of the relevant paper roll to repeat the marking process until a valid marking has taken place.

Proceeding from this, the invention is based on the object of disclosing an apparatus for identification and/or marking of objects by means of RFID, which allows reading from and writing to the memory unit of the RFID transponder with significantly improved reliability.

The object is achieved according to the invention with an apparatus for identification and/or marking of objects by means of RFID according to the preamble of claim 1 in that the at least one antenna is movably arranged.

According to the invention, the apparatus for identification and/or marking of objects by means of RFID has a read or write/read unit for wireless reading from and/or writing to a memory unit of an RFID transponder connected to the object to be identified and/or marked. Whether a purely read unit is provided or a combined write/read unit, depends on the respective application, i.e. whether the apparatus is provided for the pure identification (reading from the memory of the RFID transponder) of objects or for identification and marking (reading from and rewriting to the memory of the RFID transponder). The read or write/read unit furthermore comprises a transmitting/receiving module having at least one antenna. As a result, the wireless communication with the RFID transponder, which comprises the sending of the query and the receiving of the response modulated by the RFID transponder, is made possible.

It is achieved in an advantageous manner by a movable arrangement of the at least one antenna that the relative orientation of the antenna to the object provided with the RFID transponder can be varied during the identification or marking process over a wide range, so the antenna, at least at one instant, adopts a position in which the energy coupled into the antenna of the RFID transponder, despite any damping by the object provided with the RFID transponder, is itself sufficient to also carry out a marking of the object, i.e. a writing to the memory unit of the RFID transponder, with a high degree of operating reliability. The same obviously also applies to the identification of the object, i.e. to the pure reading of the memory content of the RFID transponder.

The movable arrangement of the at least one antenna of the transmitting/receiving module of the apparatus according to the invention can be implemented in various ways. It is thus possible to arrange the antenna in such a way that it is rotationally movable. It is likewise possible to provide a translational mobility of the antenna.

Antennas used in RFID systems are generally not rod-shaped, but planar and therefore have a radiating surface. According to a further advantageous configuration of the invention, it is provided that the at least one antenna is rotationally movable about a rotational axis substantially perpendicular to the radiating surface. It can likewise be provided that the at least one antenna is rotationally movable about a rotational axis located substantially parallel to the radiating surface. Furthermore, superimposed rotational movements about various rotational axes are also possible.

Apart from a rotational mobility, it may furthermore be provided that the at least one antenna is arranged in a translationally movable manner. A translational movement may, for example, take place along an axis located substantially parallel to a radiating surface of the at least one antenna. It may furthermore be provided that the at least one antenna is simultaneously rotationally and translationally movably arranged to allow a maximum variability with regard to its relative position with respect to the object to be identified and/or marked.

According to a further configuration of the invention, the apparatus comprises means for detecting an object to be marked and/or identified, the means being coupled to the read or write/read unit un such a way that upon detection of an object, the read or write/read unit is activated. By using detection means of this type it is ensured that the various components of the apparatus are only activated when an object to be identified and/or marked is located in the direct vicinity of the apparatus and therefore an identification or marking process is possible at all as a consequence of the limited range. If this is not the case, the components remain deactivated, whereby their service life is increased and energy is saved. The detection means may, for example, be specifically configured as a light barrier arrangement.

According to a further configuration of the invention, the apparatus comprises a drive unit for moving the at least one antenna. The at least one antenna can be rotationally and/or translationally moved in the desired manner by a drive unit of this type, which may, for example, be configured as an electric motor with a gearing connected upstream. In terms of connection, the drive unit may be coupled to move the at least one antenna and the read or write/read unit in such a way that upon activation of the read or write/read unit, the drive unit is also activated to produce the movement of the at least one antenna. A coupling of this type has the advantage that during operation of the apparatus, the antenna movement is only carried out when an identification or marking process takes place.

According to a further configuration of the invention, the apparatus may comprise a positioning unit for positioning the at least one antenna in the movement path of an object to be identified and/or marked. Since the at least one antenna can be positioned directly in the movement path of the object to be identified and/or marked, an optimal orientation of the antenna relative to the RFID transponder of the object is possible, so the reliability of the identification or marking process is still further increased. In practice, a positioning unit of this type can, for example, be implemented as an extension arm which can be translationally displaced in the movement path of the object, the at least one antenna being arranged at the free end of the extension arm. If, in addition to the at least one antenna, a drive unit is provided to move the antenna, the latter is preferably also located at the free end of the extension arm in order to minimise the structural outlay.

According to a further configuration of the invention, the positioning unit is configured as a frame construction with at least one segment which can be moved within the frame construction and into the movement path of an object to be marked and/or identified, the at least one antenna being arranged on the segment. The movement path of the object, for example a conveying section for a paper roll, and the frame of the positioning unit are in this case preferably oriented relative to one another in such a way that the object is moved through the frame. If the object to be identified and/or marked approaches the frame, the segment is advantageously moved vertically upward and/or vertically downward in the frame in order to bring about an antenna movement.

According to a further configuration, the at least one antenna is arranged together with a drive unit in an inner volume of the segment, the drive unit being configured to bring about a rotation of the at least one antenna. As a result, apart from the upward and downward movement, a further degree of freedom of movement is utilised, namely a rotation, so the operating reliability of the identification or marking process can be further increased.

According to a further particularly advantageous configuration of the invention it is provided that the at least one antenna is arranged in the conveying section of an object to be identified and/or marked in such a way that the antenna movement can be produced by the moved object itself. This has the particular advantage that no special drive unit has to be present as the antenna movement relative to the object can be directly induced by the movement of the object itself. In practice, this may be implemented, for example, in that the at least one antenna is pivotably arranged in such a way that it can be pivoted by the object to be identified and/or marked from its conveying section in the manner of a swing door. For this purpose, the at least one antenna may, for example, be arranged on a pivotable plate positioned in the conveying section of the object.

In order to further increase the reliability of the apparatus against failure, it may be provided that it additionally has a barcode scanner to identify an object. This may then be used if the RFID system as a malfunction.

The object mentioned at the outset is also achieved by a method for identification and/or marking of an object by means of RFID using an apparatus according to any one of claims 1 to 17, the method being characterised by the following steps:

activating the read or write/read unit upon the approach of an object to be identified and/or marked and     moving the at least one antenna and simultaneously identifying and/or marking the object by reading from and/or writing to the memory unit of the RFID transponder.

That stated above applies in an analogous manner to the advantages of the method.

In the course of the method according to the invention, the at least one antenna can be moved by a drive unit. However, it is likewise also possible for the movement of the antenna to be brought about by a machine operator, who guides the antenna and moves it relative to the object to be identified and/or marked. It may furthermore be provided that the at least one antenna is moved by the object to be identified and/or marked itself.

Figure 1:
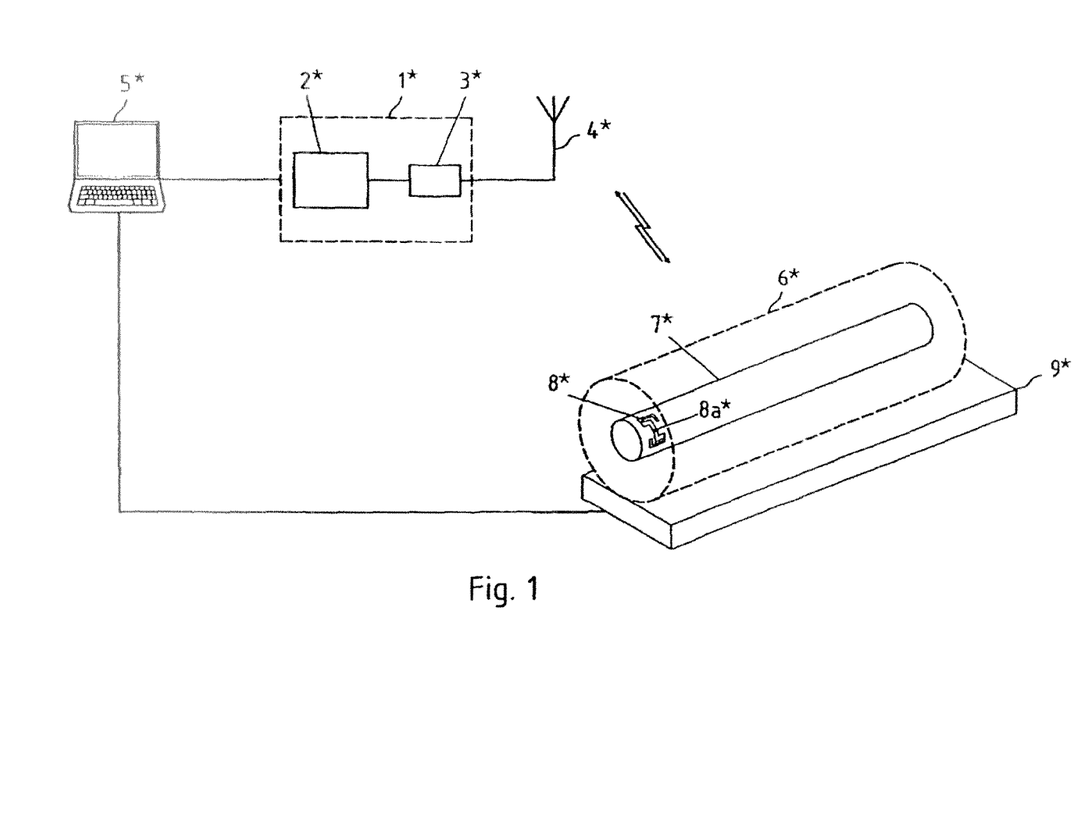
FIG. 1 shows an apparatus known from the prior art for identification and marking of paper rolls by means of RFID in a block diagram.

The invention will be described in more detail below with the aid of drawings showing exemplary embodiments, in which:

FIG. 1 shows an apparatus known from the prior art for identification and marking of paper rolls in a paper-processing operation in a highly schematic form.

The apparatus comprises a write/read unit 1*, which in turn comprises a control module 2* and a transmitting/receiving module 3* which can be activated by the control module 2*. The transmitting/receiving module 3* in turn has an antenna 4*—shown very schematically here—which communicates with RFID transponders wirelessly and, in the present case, in the UHF range of the electromagnetic spectrum.

In the present case, the RFID transponder 8* is incorporated into a tube 7* close to the end face thereof, the tube 7* forming the core of a paper roll 6*, the specific information of which with regard to, for example, the order number, customer or weight being stored as, for example, a ten digit number in a memory module 8a* provided on the RFID transponder 8*.

Provided in the apparatus shown in FIG. 1 is also an arithmetic unit 5*, which can initiate and evaluate the write/read process by means of RFID. At the same time, the arithmetic unit 5* is connected to a sensor, in the present case scales 9*, which determine the weight of the paper roll 6* in a specific phase of its production process.

It may be necessary in certain applications, for example, to read, in a reading process, the specific product data of the paper roll 6* stored on the RFID transponder 8* and store it on the arithmetic unit 5*. After further processing of the paper roll 6*, in the course of which the paper can be partially unwound, the weight of the paper roll 6* changes accordingly, which is determined by the scales 9*. The reduced weight is then guided from the scales 9* to the arithmetic unit 5*, which in turn, by means of the apparatus 1*, initiates a writing process, in which the new weight is stored on the memory module 8a* of the RFID transponder 8* of the paper roll 6*.

Figure 2:
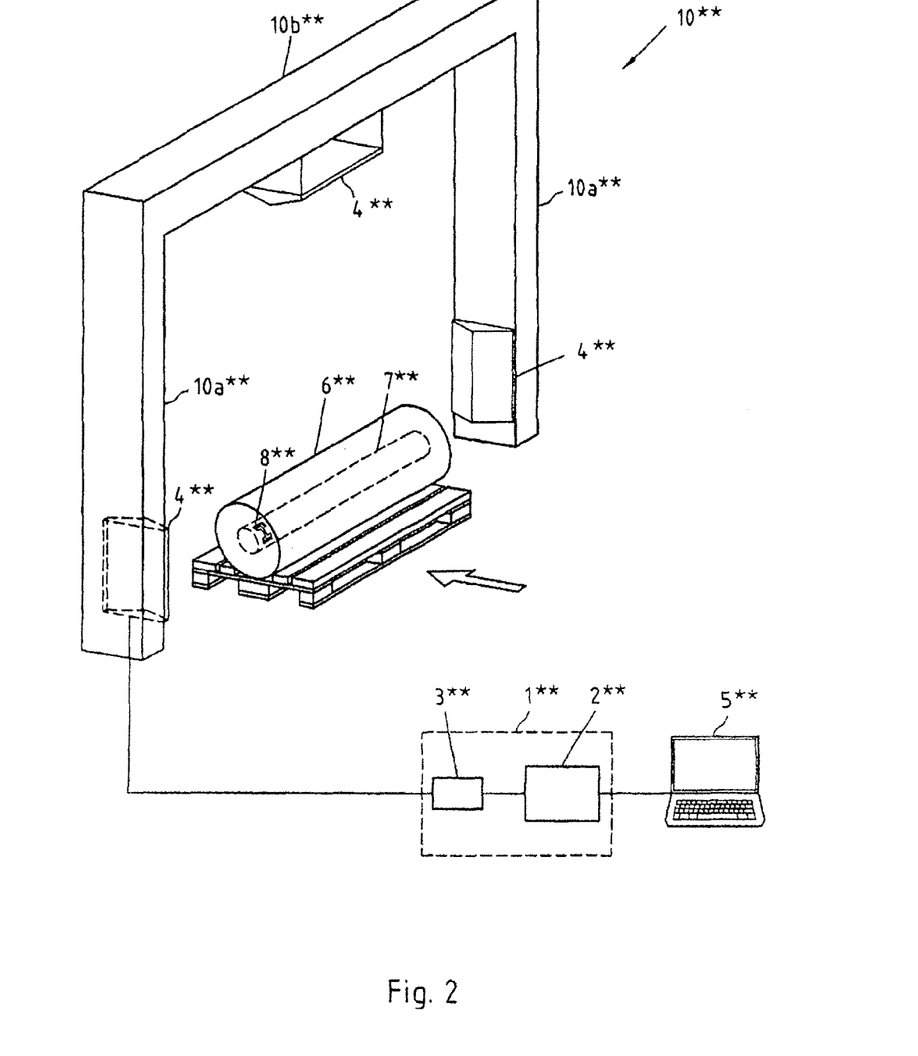
FIG. 2 shows an apparatus known from the prior art for identifying paper rolls by means of RFID in a perspective, partially schematic view, FIG. 3a, b show an apparatus for identification and/or marking of paper rolls by means of RFID with two different antenna configurations in a perspective view.

FIG. 2 now shows an apparatus for identification and marking of paper rolls, such as are also known from the prior art. The apparatus in turn comprises a write/read unit 1, which in turn comprises a control module 2 and a transmitting/receiving module 3. The write/read unit 1 is also in turn connected to an arithmetic unit 5. The transmitting/receiving module 3 is, in the present case, connected to three preferably identical antennas 4, the connection only being shown for one of the three antennas 4 for reasons of clarity. The three antennas 4 are fastened to a portal-like framework 10, one respective antenna 4, which is in turn oriented in the direction of the passage defined by the framework 10, being arranged on the two vertical supports 10a of the framework 10.

If a paper roll 6 to be identified and/or marked, which in turn has an RFID transponder 8 in its tube 7 close to one end face, is transported through the framework 10 in the arrow direction, the memory module of the RFID transponder 8 of the roll 6 can be read from or written to by at least one of the three antennas 4. If the roll 6, as in the present case, is transported in the horizontal state, the communication takes place by means of one of the antennas 4 fastened to the vertical supports 10a. On the other hand, if the paper roll 6 is transported upright, the communication preferably takes place by means of the antenna 4 arranged suspended on the upper side of the framework 10**.

Figure 3A:
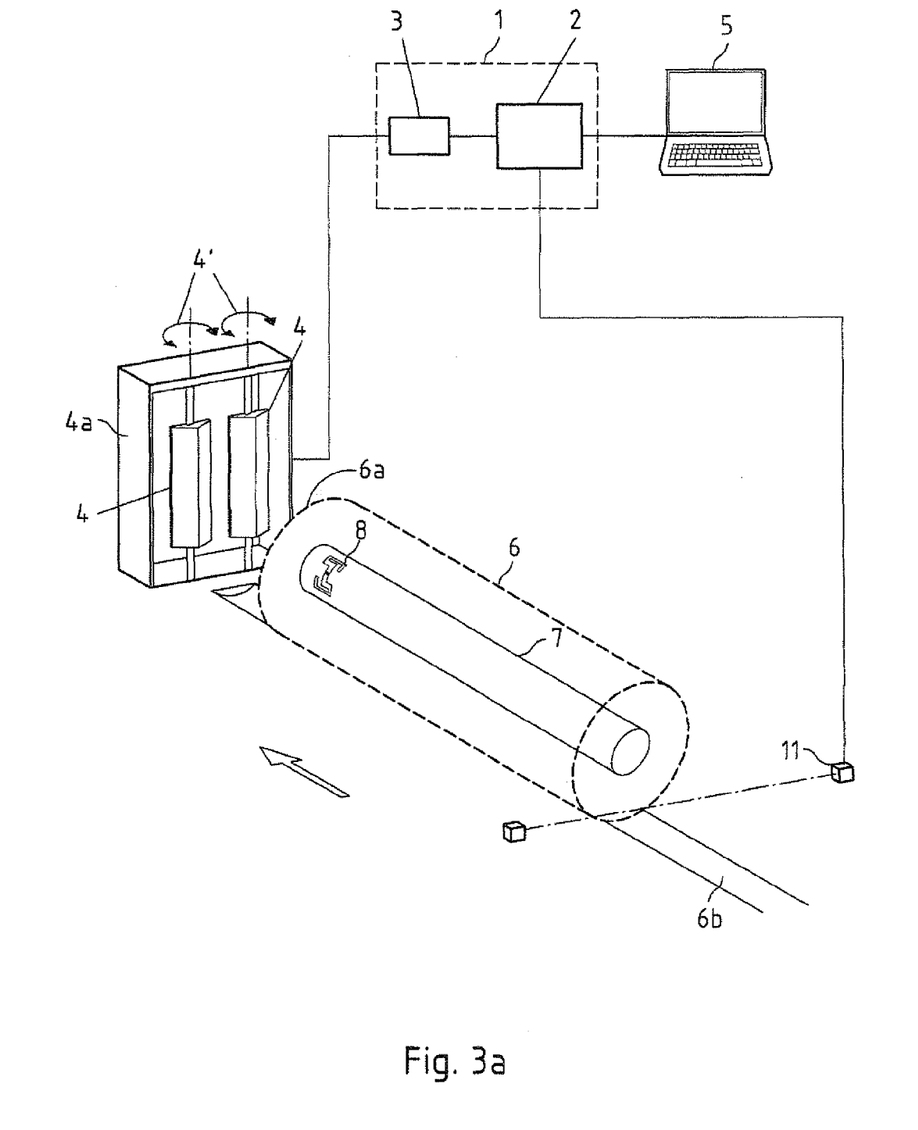

FIG. 3a now shows an apparatus for identification and/or marking of paper rolls.

The apparatus in turn comprises a write/read unit 1 with a transmitting/receiving module 3, which can be activated by a control module 2. The write/read unit 1 is in turn connected to a computer 5. The antennas connected to the transmitting/receiving module 3 of the write/read unit 1 are movably arranged according to the invention. In detail, they are mounted in such a way that they are rotationally movable about a rotational axis located parallel to their radiating surface. An oscillating movement in the same or opposite direction of the two antennas 4 can therefore take place, for example, in accordance with the arrows 4', by means of a drive unit not shown in detail. Owing to the movement of the antennas, it is achieved that the relative orientation of the antennas 4 with respect to the RFID transponder 8 provided in the tube 7 close to its end face is varied over a wide range. Therefore, the antennas 4, at least at one instant, adopt a position in which the energy coupled into the antenna of the RFID transponder 8 is sufficient, despite the damping by the wound-on paper of the paper roll 6, to carry out not only an identification of the paper roll by reading from the memory module of the RFID transponder 8, but also a marking by writing thereto with a high degree of operating reliability.

During operation of the apparatus, the paper roll 6 is moved over a conveying section 6b (movement path) in the axial direction toward the antennas 4 with its end face 6a ahead, the roll remaining with a slight spacing from the antennas 4 (typically <1 m) in a rest position. When passing the light barrier section 11, the write/read unit 1 and, with it, the transmitting/receiving module 3 and the drive unit, not shown, of the antennas 4 are activated, whereupon the read and/or write process begins. If this is successfully ended, the identified and/or newly marked paper roll 6 is transported away to a store, for example with the aid of a forklift truck (not shown).

Figure 3B:
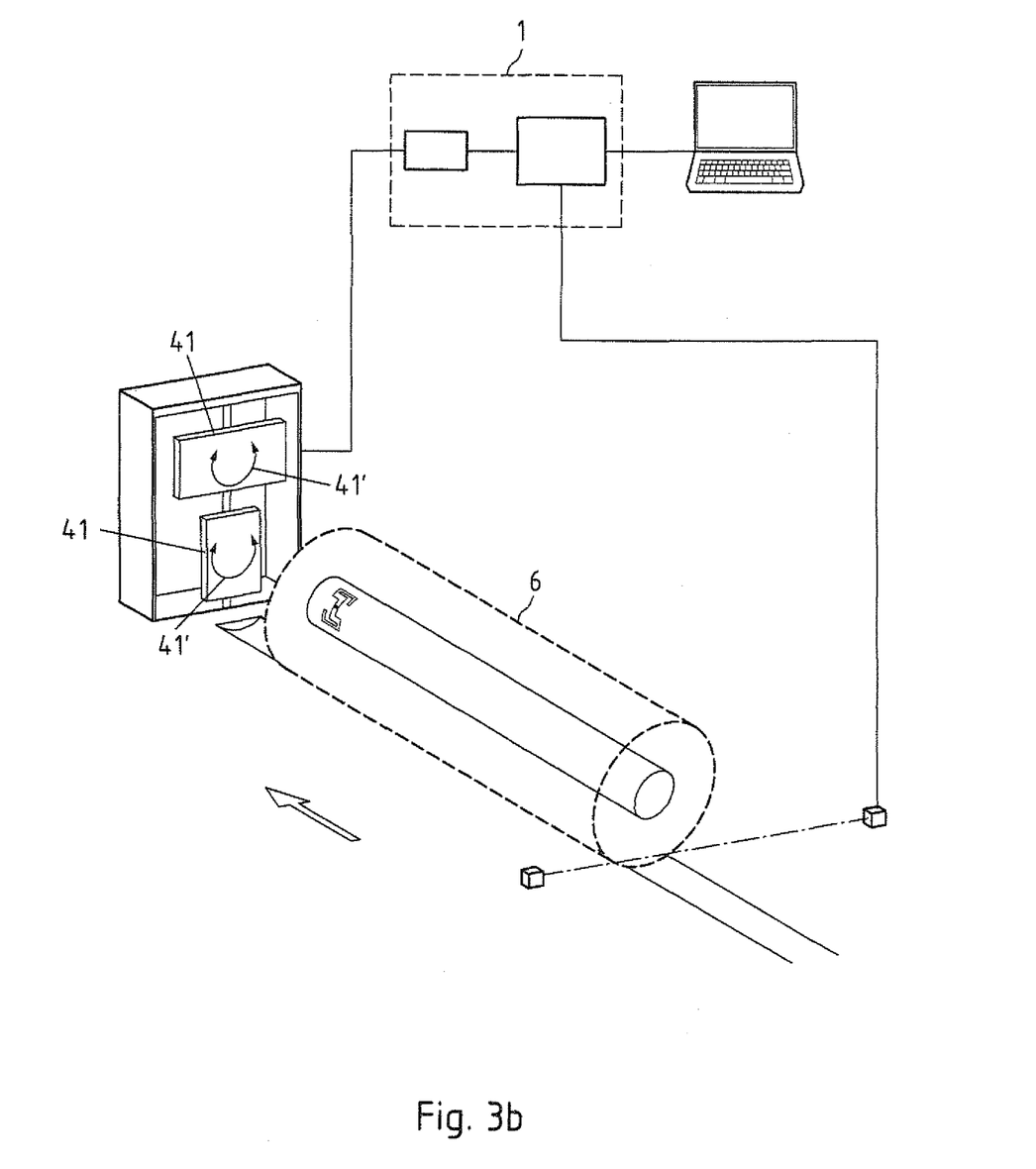

The apparatus shown in FIG. 3b differs from that from FIG. 3a in that a changed antenna configuration is selected. Thus, the antennas 41 of the apparatus of FIG. 3b are rotationally movable about a rotational axis substantially perpendicular to the radiating surface of the antennas 41, as indicated by the arrows 41'. The movement is in turn brought about by a drive unit, not shown. The movement of the antennas 41 upon the approach of the paper roll 6 may, for example, take place such that the antennas are moved from a first position, in which the upper antenna forms the transverse leg and the lower antenna the upright leg of a "T", by rotation in the same or different direction into a second position, in which the antennas 41 as a whole form an inverted "T". As also in the case of FIG. 3a, it is unnecessary as a result of the high frequency transmission to produce sight contact between the antennas 41 and the end face 6a of the paper roll 6. Accordingly, the antennas 41 may, like the antennas 4 of FIG. 3a, be arranged behind a protective cover, which has to be permeable to high frequency radiation.

Figure 4:
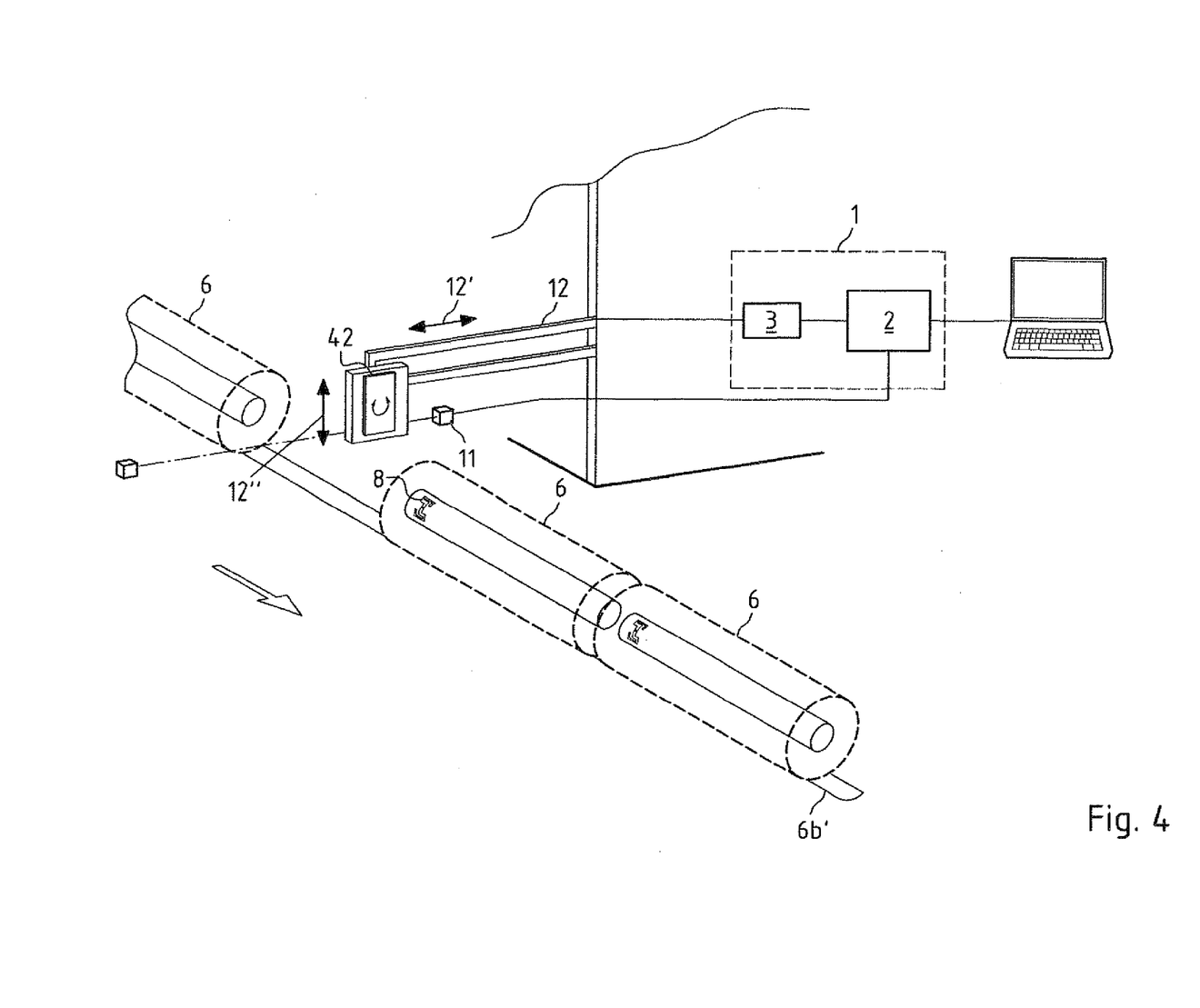
FIG. 4 shows an apparatus for identification and/or marking of paper rolls by means of RFID in a first embodiment in a perspective view.

FIG. 4 shows a further embodiment of the apparatus according to the invention for identification and/or marking of an object, in the present case again a paper roll 6. In this exemplary embodiment, the apparatus comprises a positioning unit 12 for positioning an antenna 42 in the conveying section 6b' of the paper rolls 6 to be identified and/or marked. In detail, the positioning unit is configured as an extension arm 12 which can be translationally displaced substantially perpendicular to the conveying section 6b' of the paper rolls 6 and on the free end of which the antenna 42 is arranged. As a result, the antenna 42, which is in turn rotationally movable by a drive unit, not shown, arranged together with the antenna 42 at the free end of the extension arm 12 (cf. FIG. 3b), can be pushed by the extension arm 12 into the conveyor section 6b' (arrow 12') and additionally also be varied with respect to height perpendicular to this movement (arrow 12"). As a result an antenna movement is produced, which results from two translational movements and one rotary movement and allows particularly reliable identification as to marking of the paper rolls by reading from and writing to the memory module of the RFID transponder 8 of the paper rolls 6.

During operation of the apparatus, the individual paper rolls 6 in each case provided with an RFID transponder 8 in the tube 7 are moved along the conveying section 6*b*' in the direction marked by the perspectively shown transport arrow. By passing the light barrier arrangement 11, the apparatus is activated, specifically such that the paper roll 6 is completely conveyed past the still pushed-in extension arm 12 and remains in the position of the centre one of the three paper rolls 6. The extension arm 12, as indicated by the arrow 12', is then pushed out into the conveying section 6*b*' of the paper rolls 6, and the antenna 42 is rotationally moved by the drive unit, not shown, as already described in conjunction with FIG. 3*b*. A reliable communication with the RFID transponder 8 in each case arranged close to the rear end face of the paper rolls 6 is already made possible by this antenna movement. If, in particular, the writing process cannot be directly concluded successfully, it is possible for the antenna unit to move in a translational manner along the arrow 12", i.e. upwardly, perpendicular to the conveying section 6*b*' and to the displacement direction 12' of the extension arm 12 in order to utilise a further degree of freedom of movement. As a result, the operating reliability is further increased, in particular when writing to the memory module of the RFID transponder 8 of the paper rolls 6. The marked paper rolls 6 can then be loaded, for example in batches of three rolls in each case, and be transported to the customer.

As an alternative to an individual rotationally movable antenna 42, it is possible to provide two rotationally movable antennas arranged one above the other at the free end of the extension arm 12 according to the example of FIG. 3*b* (not shown). A vertical adjustability of the antenna unit can generally thus be dispensed with owing to the readability or writeability of the transponder 8, which are thereby improved.

Figure 5:
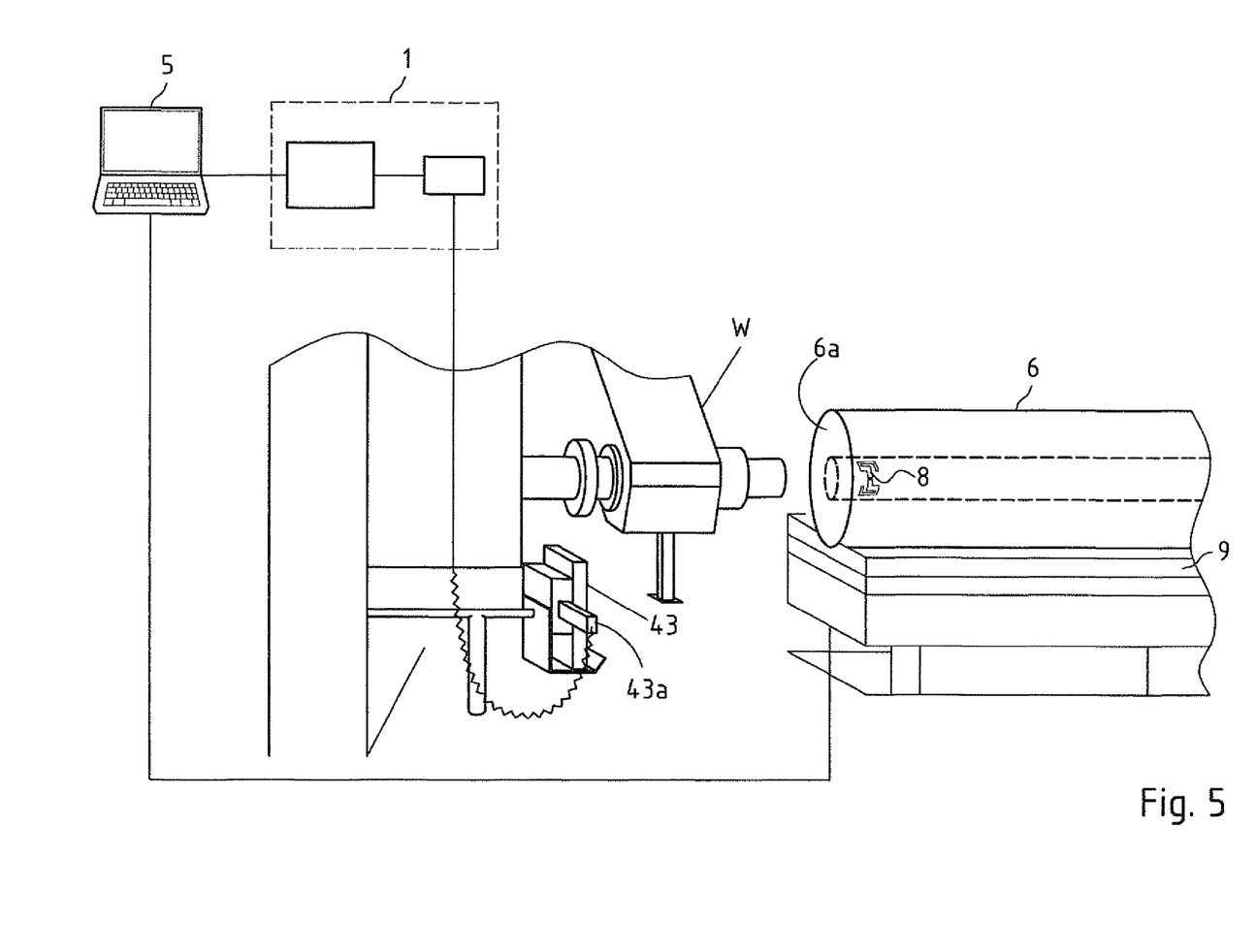
FIG. 5 shows an apparatus for identification and/or marking of paper rolls by means of RFID in a second embodiment in a perspective view, FIG. 6a, b show an apparatus for identification and/or marking of paper rolls by means of RFID in a third embodiment in a perspective view and FIG. 7a, b show an apparatus for identification and/or marking of paper rolls by means of RFID in a fourth embodiment in a perspective view.

FIG. 5 shows a further configuration of the apparatus for identification and/or marking of paper rolls by means of RFID. The apparatus in turn comprises a write/read unit 1, which is connected by its transmitting/receiving module to a movably arranged antenna 43. In this configuration of the apparatus according to the invention, the antenna movement is not brought about by a drive unit, but by the possibility of a machine operator gripping the antenna 43 by means of a handle 43*a* and manually producing the antenna movement relative to the RFID transponder 8 of the paper roll 6.

In the present exemplary embodiment, a paper roll 6 is rolled onto a lifting apparatus initially sunk in the base and provided with a scale unit 9. The memory module of the RFID transponder 8 of the roll 6 is then read by means of the antenna 43 in order to obtain the information important for further processing with respect to the paper roll, such as, for example, the order number, customer, roll weight etc. If the reading process is not successful, a machine operator takes the antenna 43 from the holder and moves it in front of the end face 6*a* of the roll 6. Owing to the antenna movement, the reading process, as described above, can be carried out with a particularly high degree of operating reliability.

The lifting apparatus is then actuated and the roll 6 of the schematically indicated winding machine W is then supplied. After partially unwinding the paper, the paper roll 6 is again picked up by the lifting apparatus, and the scale unit determines the new weight and passes it to the computer 5. The computer 5 then initiates a writing process, in the course of which the information relating to the new weight is written to the storage module of the RFID transponder 8 of the paper roll 6. This may initially take place with an unmoved antenna 43. If this is not successful, the machine operator can in turn manually move the antenna 43, so the writing process can then be successfully completed.

Figure 6A:
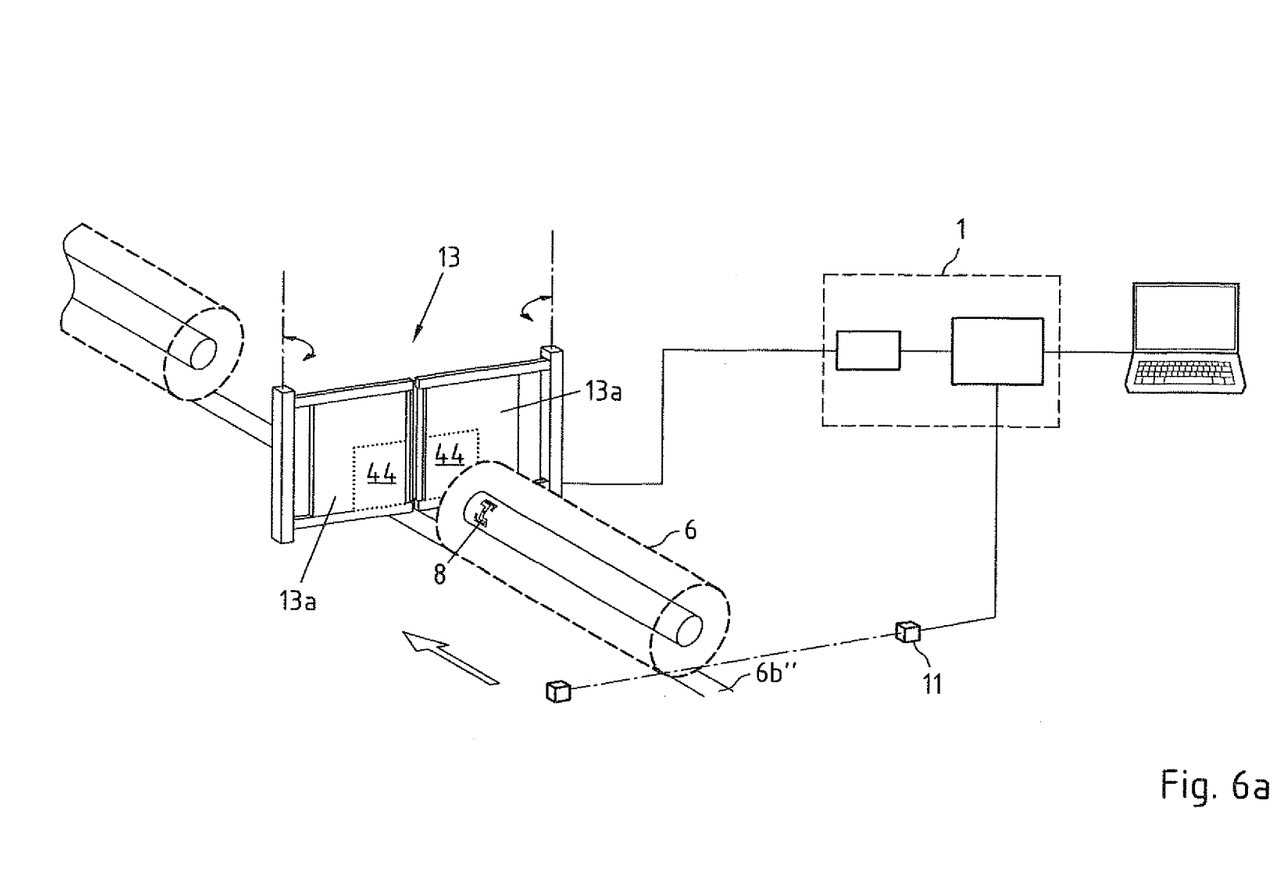
Figure 6B:
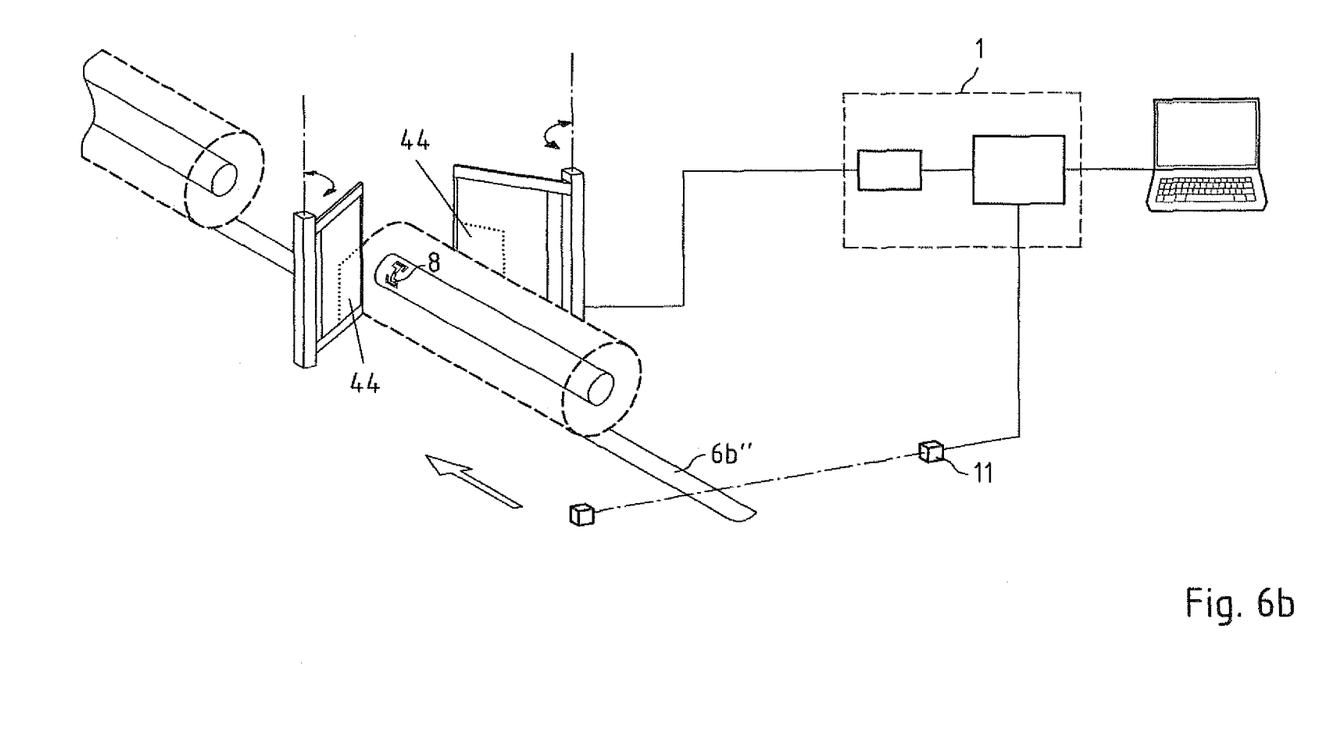

FIGS. 6*a*, 6*b* now show a further particularly advantageous configuration of the apparatus for identification and/or marking of objects, in the present case in turn paper rolls 6.

In the apparatus shown in FIGS. 6*a*, 6*b*, the antennas 44 are rigidly arranged on the two leaves 13*a* of a double swing door 13. The leaves 13*a* of the double swing door 13, which are located in the conveying section 6*b*" of the paper rolls 6, can now be pushed open purely by the continued transport movement of the paper rolls 6, the rigidly mounted antennas 44 also moving in a swinging manner with the leaves 13*a* of the double swing door 13, so the antenna movement relative to the RFID transponder 8 of the paper roll 6 to be identified and/or marked is brought about.

FIG. 6*b* shows in this regard, how the leaves 13*a* of the double swing door 13 in the then pivoted state slide along the roll 6 transported through the passage defined by the double swing door 13, it being possible, in a particularly preferred manner, for the vertical outer edges of the door leaves 13*a* to, in each case, have a roller, so no friction occurs between the outer face of the paper roll and the outer edges of the door leaves 13*a*, which could damage the paper surface. The activation of the write/read unit 1 in turn takes place by means of a light barrier arrangement 11 arranged in the transporting direction of the paper roll 6 in front of the double swing door 13. It is therefore certainly possible for the read or write process to already be successfully concluded before the double swing door 13 is actuated by the advancing roll 6. In each case, a valid write/read process is made possible by moving the antennas 44 by pushing open the swing door leaves 13*a*.

The door leaves 13*a* of the double swing door 13 may be provided with a mechanism (not shown in detail), by means of which they are raised when swinging open in order to thus generate a restoring force to swing back into the zero position. In order to prevent the door leaves 13*a* swinging back beyond the zero position shown in FIG. 6*a*, the doors may be provided on their hinges with a corresponding stop apparatus.

It is obvious in the exemplary embodiment of FIG. 6*a*, 6*b* that instead of two door leaves 13*a* a single door leaf with an antenna rigidly arranged on the door leaf may also be provided (not shown). It is also obvious that the antenna arranged on the door leaf or leaves may also be rotationally movable (also not shown), in order to still further increase the operating reliability during the write/read process.

Figure 7A:
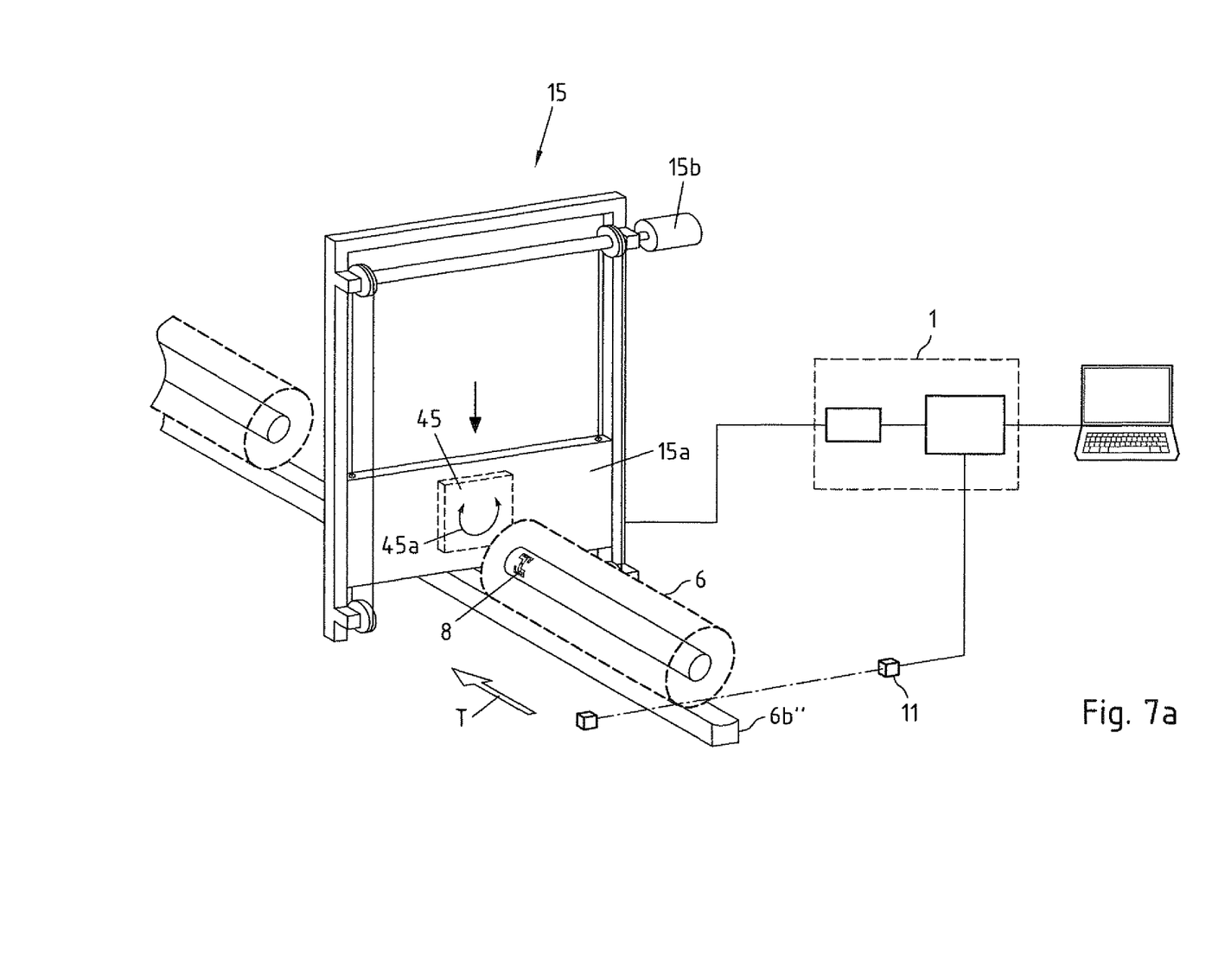
Figure 7B:
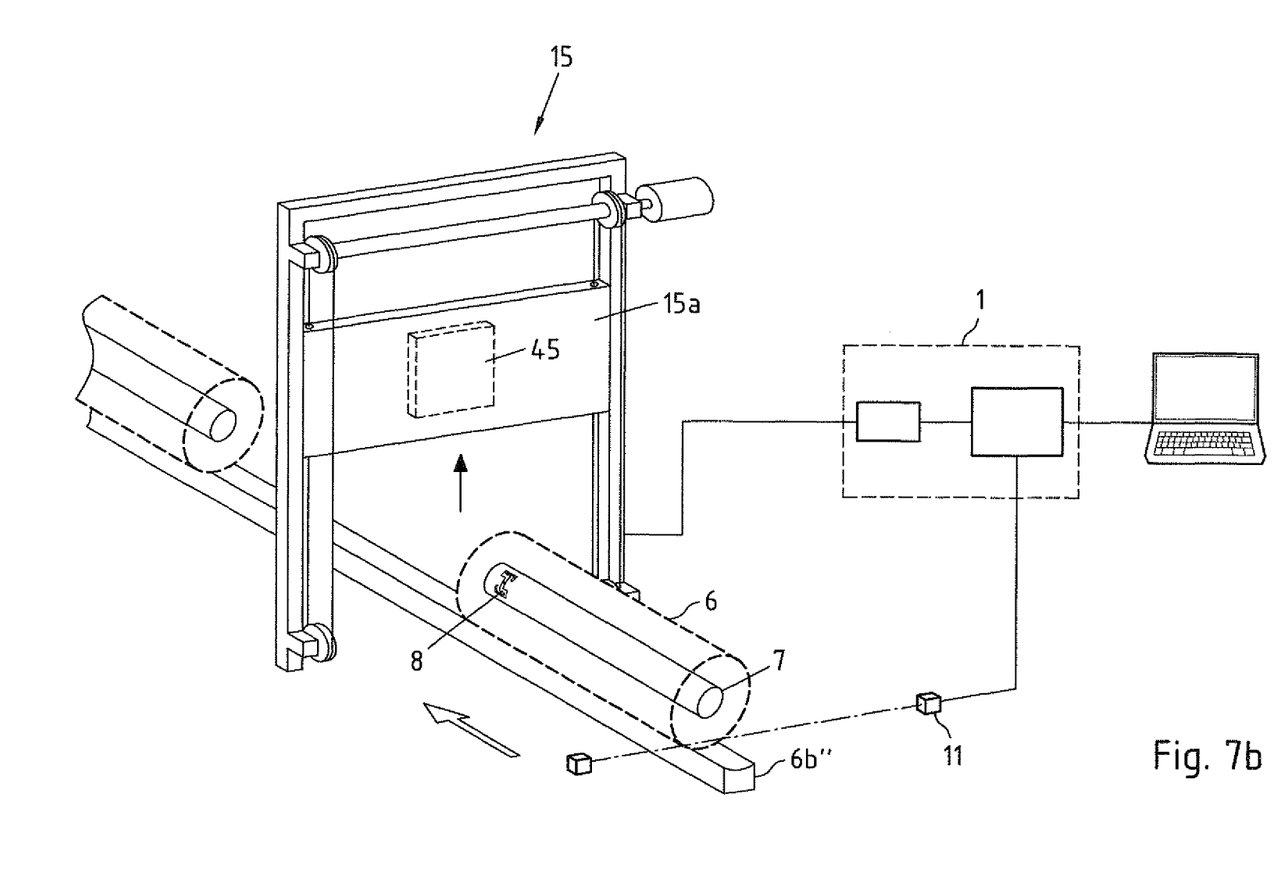

FIG. 7 shows a further embodiment of the apparatus for identification and/or marking of objects, in the present case in turn paper rolls 6. The latter comprises, similarly to the embodiment described in conjunction with FIG. 4, a positioning unit 15 for positioning an antenna 45 in the conveying section 6*b*" of the paper rolls 6. In the present case, the positioning unit is configured as a frame construction 15 with a segment 15*a* which can be moved within the frame construction 15 and into the movement path of the paper roll 6 to be identified and/or marked, the antenna 45 being arranged on the segment 15*a*. The frame construction 15 of FIG. 7 with the segment 15*a* movable therein in the present case is similar to a gate frame with a vertically movable sectional gate segment therein, but can obviously also be constructed in a different manner.

Owing to the vertical upward and downward movement of the segment 15*a*, an antenna movement relative to the paper roll 6 to be identified and/or marked is already brought about, so purely by this movement, the marking or identification process can be carried out with a high degree of operating reliability. In addition, as indicated by the arrow 45*a* in FIG. 7*a*, a rotation of the antenna 45 about a rotational axis perpendicular to the radiating surface of the antenna 45 can take place. This is brought about by a drive unit (not shown) arranged together with the antenna 45 in a free volume of the hollow segment 15*a*.

During operation of the apparatus of FIG. 7, the individual paper rolls 6 in each case provided with an RFID transponder 8 in the tube 7 are moved along the conveying section 6*b*" in the direction marked by the perspectively shown transport arrow T. If a roll 6 to be identified and/or marked passes a light barrier arrangement 11, the transportation of the paper roll 6 is interrupted in a delayed manner in such a way that the paper roll with the end face, in the vicinity of which the RFID transponder 8 is arranged, remains directly in front of the frame 15. At the same time, the apparatus is activated in such a way that the segment 15*a* is moved from an upper rest position (FIG. 7*b*) by means of a cable pull operated by an electric motor 15*b* into a lower position (FIG. 7*a*), whereby a translational movement of the antenna 45 relative to the RFID transponder 8 is brought about. In addition to this vertical movement, the drive unit of the antenna 45 brings about a rotation thereof in accordance with the double arrow 45*a*. This antenna movement allows reliable communication with the RFID transponder 8. If a valid identification or marking has not taken place, the translational movement of the antenna 45 with the segment 15*a* and the rotational movement can be repeated.

If the identification and/or marking has been successfully completed, the segment 15*a* with the antenna 45—it is obvious that more than one antenna may be accommodated in the segment—moves back into the upper rest position (FIG. 7*b*) and the paper roll 6 can be transported through the frame 15 and supplied, for example, to a packaging station. The apparatus is then available for a renewed identification and/or marking process.

The invention claimed is:

1. Apparatus for identification or marking of objects by means of radiofrequency identification (RFID) with a read or write/read unit for wireless reading from or writing to a memory unit of an RFID transponder connected to the object to be identified or marked, wherein the read or write/read unit comprises a transmitting/receiving module having at least one antenna, characterized in that the at least one antenna is movably arranged, wherein the apparatus comprises a positioning unit for positioning the at least one antenna in a movement path of the object to be identified or marked, wherein the positioning unit is configured as an extension arm which is configured to be displaced in a translational manner into the movement path and arranged on a free end of which is the at least one antenna, and wherein the at least one antenna is arranged together with the drive unit at the free end of the extension arm.

2. Apparatus according to claim 1, wherein the at least one antenna is arranged in a rotationally movable manner.

3. Apparatus according to claim 2, wherein the at least one antenna as a radiating surface and is rotationally movable about a rotational axis substantially perpendicular to the radiating surface.

4. Apparatus according to claim 3, wherein the at least one antenna has a radiating surface and is rotationally movable about a rotational axis substantially parallel to the radiating surface.

5. Apparatus according to claim 1, wherein the at least one antenna is arranged to be translationally movable.

6. Apparatus according to claim 5, wherein the at least one antenna has a radiating surface and is arranged to be translationally movable along an axis located substantially parallel to the radiating surface.

7. Apparatus according to claim 6, wherein means are provided to detect an object to be identified or marked, wherein the means are coupled to the read or write/read unit in such a way that upon detection of an object, the read or write/read unit is activated.

8. Apparatus according to claim 7, wherein the detection means are configured as a light barrier arrangement.

9. Apparatus according to claim 1, wherein the apparatus comprises a drive unit to move the at least one antenna.

10. Apparatus according to claim 9, wherein the drive unit to move the at least one antenna and the read or write/read unit are coupled in such a way that upon activation of the read or write/read unit, the drive unit is activated to produce the movement of the at least one antenna.

11. Apparatus according to claim 9, wherein the drive unit is configured as an electric motor with a gearing connected upstream.

12. Apparatus according to claim 1, wherein the at least one antenna is arranged in the movement path of an object to be identified or marked, in such a way that the antenna movement is configured to be produced by the moved object.

13. Apparatus according to claim 12, wherein the at least one antenna is pivotably arranged in such a way that the antenna is configured to be pivoted by an object to be identified or marked from the movement path thereof in the manner of a swing door.

14. Apparatus according to claim 1, wherein the apparatus additionally has a barcode scanner to identify an object.

15. Method for identification or marking of an object by means of radiofrequency identification (RFID) comprising the following steps:
activating the read or write/read unit upon the approach of an object to be identified or marked, moving the at least one antenna and simultaneously identifying or marking the object by reading from or writing to the memory unit of a RFID transponder; and
positioning the at least one antenna in the movement path of the object to be identified or marked,
displacing an extension arm in a translational manner into the movement path wherein on a free end of the extension arm is arranged the at least one antenna and wherein the at least one antenna is arranged together with the drive unit at the free end of the extension arm.

16. Method according to claim 15, wherein the at least one antenna is moved by a drive unit.

17. Method according to claim 15, wherein the at least one antenna is moved by a machine operator.

18. Method according to claim 15, wherein the at least one antenna is moved by the object to be identified or marked.

19. An apparatus for identification or marking of objects by means of radiofrequency identification (RFID) with a read or write/read unit for wireless reading from or writing to a memory unit of an RFID transponder connected to the object to be identified or marked,
wherein the read or write/read unit comprises a transmitting/receiving module having at least one antenna, characterized in that the at least one antenna is movably arranged, wherein the apparatus comprises a positioning unit for positioning the at least one antenna in a movement path of the object to be identified or marked, wherein the positioning unit is configured as a frame construction with at least one segment, which is configured to be moved within the frame construction and into the movement path of an object to be identified and/or marked, the at least one antenna being arranged on the segment, and wherein the at least one antenna is arranged together with the drive unit in an inner volume of the segment, the drive unit being configured to bring about a rotation of the at least one antenna.

20. Method for identification or marking of an object by means of radiofrequency identification (RFID) comprising the following steps:

activating the read or write/read unit upon the approach of an object to be identified or marked;

moving the at least one antenna and simultaneously identifying or marking the object by reading from or writing to the memory unit of a RFID transponder and positioning the at least one antenna in a movement path of the object to be identified or marked, wherein the positioning unit is configured as a frame construction with at least one segment; and moving the segment within the frame construction and into the movement path of an object to be identified or marked, the at least one antenna being arranged on the segment, and wherein the at least one antenna is arranged together with the drive unit in an inner volume of the segment, and bring about a rotation of the at least one antenna.

* * * * *